United States Patent [19]

Mantey

[11] 3,809,335

[45] May 7, 1974

[54] WEB MOVEMENT CONTROL IN A REEL-TO-REEL WEB TRANSPORT

[75] Inventor: John P. Mantey, Boulder, Colo.

[73] Assignee: International Business Machines Corporation, Armonk, N.Y.

[22] Filed: June 29, 1972

[21] Appl. No.: 267,301

[52] U.S. Cl. .............. 242/186, 242/75.51, 242/190, 318/6, 318/7, 318/326, 318/397

[51] Int. Cl.. G11b 15/32, G11b 15/52, B65h 77/00

[58] Field of Search ........... 242/75.51, 75.52, 75.44, 242/75.47, 75.5, 186, 188, 189, 190, 191; 318/6, 7, 326, 327, 328, 397, 398

[56] References Cited

UNITED STATES PATENTS

| | | | |
|---|---|---|---|
| 3,060,358 | 10/1962 | Peeples et al. | 242/75.51 X |
| 3,112,052 | 11/1963 | Johnson | 242/186 UX |
| 3,283,228 | 11/1966 | Asseo | 242/75.51 X |
| 3,416,058 | 12/1968 | Hill et al. | 318/6 X |

*Primary Examiner*—John W. Huckert
*Assistant Examiner*—John M. Jillions
*Attorney, Agent, or Firm*—Francis A. Sirr

[57] ABSTRACT

The acceleration/deceleration, speed, position and tension of a length of unbuffered magnetic recording tape running between the two reels of a reel-to-reel tape transport are accurately controlled by a reel motor control servomechanism which jointly controls the two reel motors in response to a plurality of reference signals and a plurality of error signals. A start/-stop command controls tape movement. The start/stop command produces a characterized start/stop pulse which is successively integrated to generate an acceleration/deceleration reference signal, a speed reference signal and a position reference signal. A characterized tension command pulse is integrated to generate a tension reference signal. The characterized start/stop command pulse, the characterized tension command pulse, and the acceleration/deceleration, speed and tension reference signals are individually weighted for each of the two motors, the weighting being calculated to control the motors in a manner to achieve desired tape acceleration/deceleration, speed and tension parameters. The four reference signals, including position, are compared to like signals representing the actual value of these tape parameters. As a result of this comparison, four like error signals are generated. These error signals are individually weighted for each of the motors and then summed with the above-mentioned individually weighted reference signals. Each motor is controlled by five individually weighted reference signals (characterized start/-stop, characterized tension, acceleration, speed and tension) and four individually weighted error signals (acceleration, speed, tension and position). Each signal is individually weighted for its particular motor.

9 Claims, 5 Drawing Figures

FIG. 3
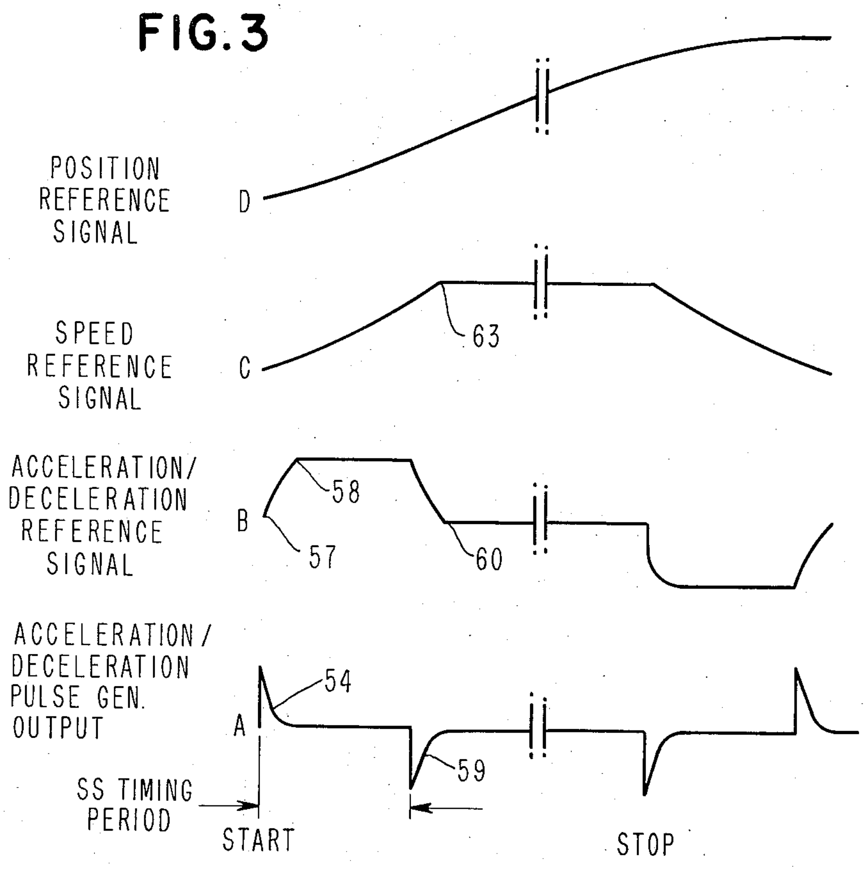
FIG. 4
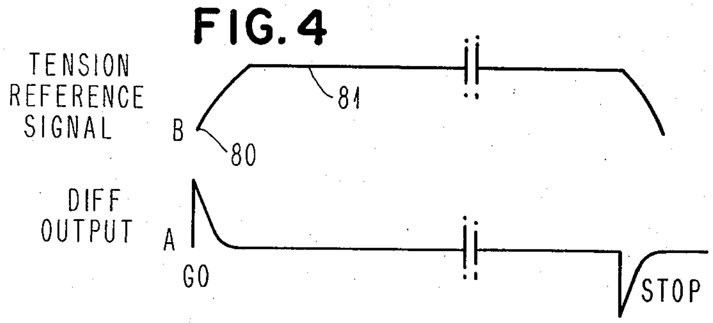
FIG. 5
$$e_1 = K_1 Pe + K_3 Se + K_5 Sr + K_7 Ae + K_9 Ar + K_{11} Te + K_{13} Tr + K_{15} C_1 + K_{17} C_2$$
$$e_2 = K_2 Pe + K_4 Se + K_6 Sr + K_8 Ae + K_{10} Ar + K_{12} Te + K_{14} Tr + K_{16} C + K_{18} C_2$$
WHERE:
Pe = POSITION ERROR
Se = SPEED ERROR
Sr = SPEED REFERENCE
Ae = ACCELERATION ERROR
Ar = ACCELERATION REFERENCE
Te = TENSION ERROR
Tr = TENSION REFERENCE
$C_1$ = CHARACTERIZED START/STOP COMMAND
$C_2$ = CHARACTERIZED TENSION COMMAND

WEB MOVEMENT CONTROL IN A REEL-TO-REEL WEB TRANSPORT

RELATED INVENTION

The present invention is related to the copending application of William B. Phillips, Ser. No. 198,925, filed Nov. 15, 1971, commonly assigned now abandoned. This copending application is directed to a reel-to-reel web transport wherein web speed and web tension parameters are measured and compared to commands for these parameters to thereby originate speed and tension error signals. These two error signals jointly control the two reel motors in accordance with a specified control algorithm.

BACKGROUND OF THE INVENTION

The present invention pertains to the general field of winding and reeling, and more specifically to the field of the reeling and unreeling of web-like material which carries machine-convertible information, and to the simultaneous control of plural reel drives thereof.

This web-like material may be magnetic tape whose discrete states of magnetization in localized areas are the machine-convertible information or digital data. Transports for magnetic tape can be broadly characterized as buffered or unbuffered. The present invention relates to the latter type and particularly to a transport which is further characterized as a reel-to-reel transport wherein a length of unbuffered magnetic tape extends between a supply reel and a take-up reel. This length of tape cooperates with a tape processing station, which may include various means, such as a read head, a write head, an erase head, a tape cleaner, and a BOT/EOT assembly. The speed, position and tension of the tape as it passes through the tape processing station must be accurately controlled, and in most applications must be maintained piecewise-constant, i.e., constant over an interval. This is accomplished by controlling the energization of the two reel motors.

The prior art discloses apparatus which provides two tape tension sensors, one on each side of the tape processing station. Each sensor controls that reel motor which is on its side of the processing station. The tension sensing transducers may be mechanical devices, as by having movable tension arms engage the tape with rollers, or they may be nonmechanical devices, as by having the tape pass over air bearings and then sensing the pressure at the tape-bearing interface as an indication of tape tension.

The prior art also provides a pivoted link which supports a roller on each side of the processing station, such that the link assumes an angular position in accordance with a comparison of the tape tension on the two sides of the processing station. The variable link position is then used to differentially control the two reel motors in a manner to maintain the sum of these two tensions constant.

Other prior art discloses a two-capstan tape transport wherein the speed of the take-up capstan is controlled from a head which senses a prerecorded reference track carried by the tape, and the supply capstan is controlled from a tape tension transducer which senses the tape tension at a point between the supply capstan and the head.

Still other prior art discloses a reel-to-reel device in which a tape speed tachometer controls one or both reel motors and a tape tension transducer controls the other reel motor.

Single-motor servomechanisms are known where the travel curve of a load, such as an elevator, is computed by successive integration of rate-of-acceleration, acceleration, and velocity to produce a load distance-versus-time curve. The closed-loop servo which variably energizes the load includes only an actual-velocity feedback signal.

SUMMARY OF THE INVENTION

The essential components of a reel-to-reel web or tape transport are a take-up reel driven by a first motor, a supply reel driven by a second motor, an unbuffered tape path for guiding the tape between the two reels, and a tape processing station or magnetic transducer such as a read/write head located in the tape path and forming a transducing interface with the magnetic recording tape at this location.

The goal of the two-motor servomechanism is to dynamically control the tape's acceleration/deceleration, speed, tension, and linear position parameters at this transducing interface. The input commands to the servo are binary conditions such as start/stop and forward/backward. From these commands, the servo energizes the two motors such that the tape moves in a desired manner.

The structure of the present invention derives servo reference signals for tape acceleration/deceleration, speed and position by means of successive integration of a characterized start/stop command pulse. The character of this pulse is predefined by analysis of a differential equation mathematical model of the reel-to-reel system.

The use of the term "integration" herein to identify the modification of a signal by an electrical means is intended to be a generic definition of any means capable of generating a signal which is the solution to a differential equation. Typically, such a means can be implemented electrically by using networks of operational amplifiers, resistors and capacitors.

Specifically, the characterization of this pulse takes the form of a short time duration pulse whose integral produces an acceleration-reference signal which defines the model's desired tape acceleration parameter. This acceleration-reference signal is integrateed until the model's desired tape speed parameter is reached, thereby producing a speed-reference signal, whereupon the character of the start/stop command pulse becomes a similar short time duration pulse of the opposite polarity. This opposite polarity pulse reduces the acceleration-reference signal to substantially zero. Thereafter, the speed-reference signal remains at a steady-state value which defines the desired tape speed of the model.

These two servo reference signals, namely acceleration and speed, are used directly, through a weighting network, to control the energization of the two reel motors.

As tape continues to move, integration of the speed reference signal provides a continuously increasing magnitude position-reference signal of the model.

During dynamic servo control of the two motors, the system's actual tape acceleration and speed, and perhaps position, are continuously compared to the like reference signals for the model. As a result of this comparison, like error signals are generated and these error signals are individually weighted and used to control energization of the two reel motors.

The acceleration and speed reference signals are generated in a manner to represent the desired performance of the reel-to-reel system, as represented by the model. These reference signals are individually weighted for each of the two motors to energize these motors in a manner to exactly achieve the desired conditions. However, should operation parameters vary, such as friction in the tape path, the above-mentiond error signals, including perhaps position error, achieve the exact desired tape parameter conditions. Thus, feedback is required only to make corrections for errors caused by dynamic deviation between the actual system performance and its calculated mathematical model performance. In other words, for those dynamic intervals during which the actual system and the model system are closely matched, only the acceleration and speed reference signals are effective to control the mode of energization of the two motors.

The use of the term "actual" herein to identify a dynamic parameter of the reel-to-reel system is intended to be a generic definition of any means whereby an actual parameter of the system is measured, and as a result of such measurement, as estimate is made as to the instantaneous magnitude of the particular parameter.

A further characterized tension command pulse or signal achieves tape tension control. The character of this signal is likewise predefined by analysis of a mathematical model of the reel-to-reel system. Specifically, this characteristic takes the form of a short time duration pulse whose integral produces the model's desired change in tension.

This tension-reference signal is used directly, through weighting networks, to control the energization of the two motors.

During dynamic servo control of the two motors, the system's actual tape tension is compared to the model's tension-reference signal. As a result of this comparison, a tension-error signal is generated, weighted, and used to directly control the two motors. Here again, the tension-error signal is effective only during those intervals when the actual system performance varies for the model system performance.

The foregoing and other features and advantages of the invention will be apparent from the following more particular description of a preferred embodiment of the invention as illustrated in the accompanying drawing.

DESCRIPTION OF THE PREFERRED EMBODIMENT

Figure 1:
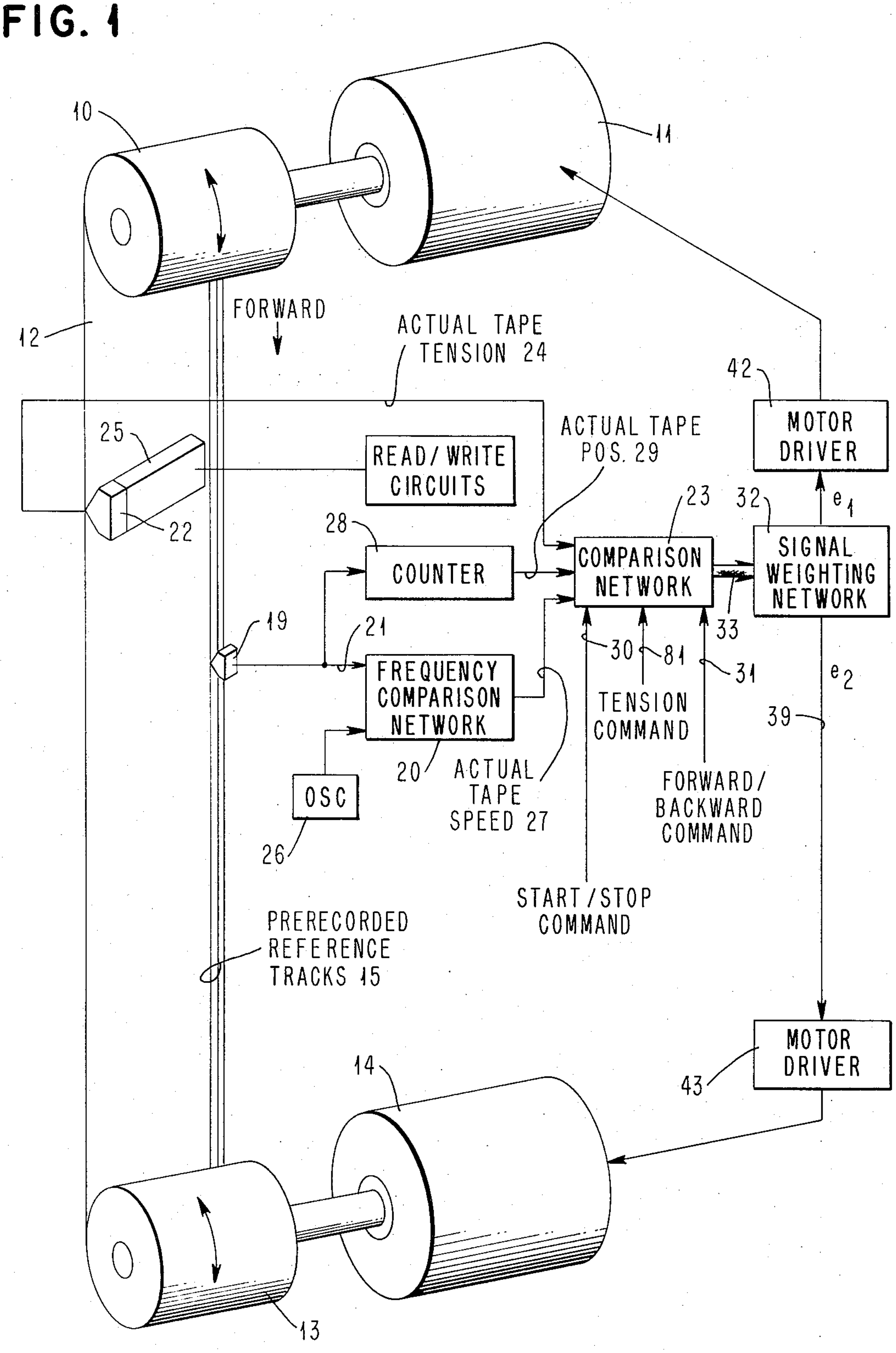
FIG. 1 is a diagrammatic showing of a magnetic tape reel-to-reel web transport incorporating the present invention.

Referring to FIG. 1, the web transport diagrammatically disclosed therein is a simplified reel-to-reel magnetic tape transport which facilitates an explanation and an understanding of the present invention. Many of the structural details of such a web transport have been eliminated to simplify the disclosure. For example, various support and guidance devices are not disclosed. Furthermore, details of the supply reel or cartridge, the manner of threading the end of the tape from the supply reel to the take-up reel, and the means of attaching the end of the tape to the take-up reel, as by vacuum force, have not been disclosed. The following description of the present invention, and of the manner and process of making and using the same is in such full, clear, concise and exact terms as to enable any person skilled in the art to which the present invention pertains, or with which it is most nearly connected, to make and use the same, without a detailed disclosure of the various devices of this type which most likely would be used in the commercial embodiment of a web transport incorporating the teachings of the present invention.

In FIG. 1 the supply reel is designated generally by reference numeral 10. This supply reel is bidirectionally driven by supply reel motor 11. The supply reel carries a relatively wide web in the form of magnetic tape 12. A length of unbuffered tape extends between the supply reel and take-up reel 13. The take-up reel is connected to be bidirectionally driven by take-up motor 14.

By way of example, the lateral width of tape 12 may be approximately 4 inches. Because of its width, the tape can carry a plurality of laterally positioned groups of digital data tracks and a prerecorded reference track 15 of known linear characteristic. By way of example, reference track 15 may include prerecorded digital signal of constant repetition rate or frequency, i.e., pulses recorded on tape at fixed distance increments.

Control transducer means in the form of a magnetic transducing head 19 is mounted at a fixed linear and transverse position and cooperates with the length of unbuffered tape. This control transducer means includes a magnetic head which reads reference track 15 and provides a cyclic output signal whose time repetition rate is a function of tape speed. This output is applied to frequency comparison network 20 by way of conductor 21.

While the prerecorded track method of measuring tape speed is disclosed, it is recognized that other means such as a tape driven tachometer, can be used to derive a signal representative of the tape speed, and that such other means is considered to be equivalent to transducer means 19.

Transducer means 22 is a tension transducer which provides an actual-tape-tension signal to comparison network 23 by way of conductor 24. The details of construction of this tension transducer means are not disclosed. The present invention contemplates that this transducer can be implemented by a variety of force transducer means shown in the prior art, for example, a magnetic head such as transducer 19 which includes a mechanical feeler, or a pressure responsive air jet or bearing, or a load cell type transducer. Tension may also be sensed by measuring the armature current to the two motors 11 and 14 and the tape speed. Tension is then computed by means which implements a tension equation whose coefficients are derived from the differential equation model of the reel-to-reel system.

Control transducer means 22 is shown in alignment with data processing head 25 whereas control transducer means 19 is shown linearly displaced from head 25. The most critical tape-to-head transducing interface exists at head 25. Control transducer means 22 is ideally located at this interface. The structure of FIG. 1 exaggerates the displacement of tranducer means 19 and head 25 in order to facilitate an understanding of the fact that the output signal 21 can be manipulated and interpreted to accurately indicate the desired physical tape speed phenomenons at the tape-to-head interface of head 25. In its broader aspect, transducer means 19 may be considered as a transducer means which measures both the tape speed and the tape tension at the tape-to-head interface of data processing head 25. For example, transducer 19 may be formed integrally with transducer 22.

Comparison network 20 receives the output of high frequency oscillator 26 as a second input. Network 20 compares the frequency of output 21 received from transducer means 19 (variable with tape speed) with the constant frequency output of oscillator 26 and generates an actual-tape-speed output signal on conductor 27.

The output of transducer means 19 consists of one pulse of each incremental unit of movement of tape 12. This output is applied as an input to counter 28. This counter may be controlled in a variety of modes. For example, the counter may be reset to zero when the tape is at rest, such that a subsequent command to move tape causes the counter to continuously increment. In this case, the number stored in counter 28 at any given instant is a measure of the position of tape 12 relative to its prior rest or stopped position. As an alternative, counter 28 may be inhibited until a command to stop tape is received, whereupon the counter is enabled and increments only during the deceleration interval. In this case, the number stored in counter 28 is a measure of the position of tape 12 relative to the position it occupied when the stop command was first received. In either event, the output of counter 28 provides an actual-tape-position sighal on conductor 29.

Comparison network 23 receives as inputs the actual-tape-tension signal, the actual-tape-speed signal, and the actual-tape-position signal. These signals indicate these tape parameters at the location of head 25. Network 23 also receives as inputs the commands, start/-stop, tension and forward/backward, conductors 30, 81 and 31 respectively. These commands are, for example, binary commands having, in the case of the start/stop command, one state defining a start command and the alternate state defining a stop command.

A simple differential equation mathematical model of the reel-to-reel system of FIG. 1 can be expressed by the following four coupled, linear, first-order differential equations, wherein an ideal inelastic tape, with no mass and no friction drag, couples the two motors:

$$(d/dt)i_1 = (1/L_1)[e_1 - R_1 i_1 - K_{e_1} \omega_1]$$

$$(d/dt)i_2 = (1/L_2)[e_2 - R_2 i_2 + K_{e_2} (r_1/r_2)\omega_1]$$

$$(d/dt)\omega_1 = (1/J)[K_{t_1} i_1 - (r_1/r_2) K_{t_2} i_2 - B\omega_1]$$

$$(d/dt)\phi_1 = \omega_1$$

In these equations, the terms $e_1$ and $e_2$ are voltage terms which define the energization voltages for the armatures of motors 11 and 14, respectively. The terms $i_1$ and $i_2$ define the current flowing through the armatures of motors 11 and 14, respectively. The terms $r_1$ and $r_2$ are the tape radii at the two reels 10 and 13, respectively. The term $\omega_1$ defines the angular velocity or speed of motor 11 (also reel 10). The terms $L_1$ and $L_2$ define the armature inductance of motors 11 and 14, respectively. The terms $R_1$ and $R_2$ define the armature resistance of motors 11 and 14, respectively. The terms $K_{e_1}$ and $K_{e_2}$ define the back emf constants of motors 11 and 14, respectively. The terms $K_{t_1}$ and $K_{t_2}$ define the torque constants of motors 11 and 14, respectively. The term $\phi_1$ defines the angular position of motor 11.

The term J defines the system inertia and can be expressed as $$J = J_1 + (r_1^2/r_2^2) J_2$$

where $J_1$ and $J_2$ are the inertia of motors 11 and 14 and their loads, respectively. The term B defines the system damping factor and can be expressed as $$B = B_1 + (r_1^2/r_2^2) B_2$$

where $B_1$ and $B_2$ are the damping factors of motors 11 and 14 and their loads, respectively.

Tape tension is expressed by the following equation, assuming the tension to be constant throughout the length of the tape which runs between the reels:

$$f = (1/r_1)[1 - (J_1/J)] K_{t_1} i_1 + (1/r_2)(J_1/J) K_{t_2} i_2 - [(B_1/r_1) - (J_1 B/J r_1)]\omega_1.$$

Figure 2:
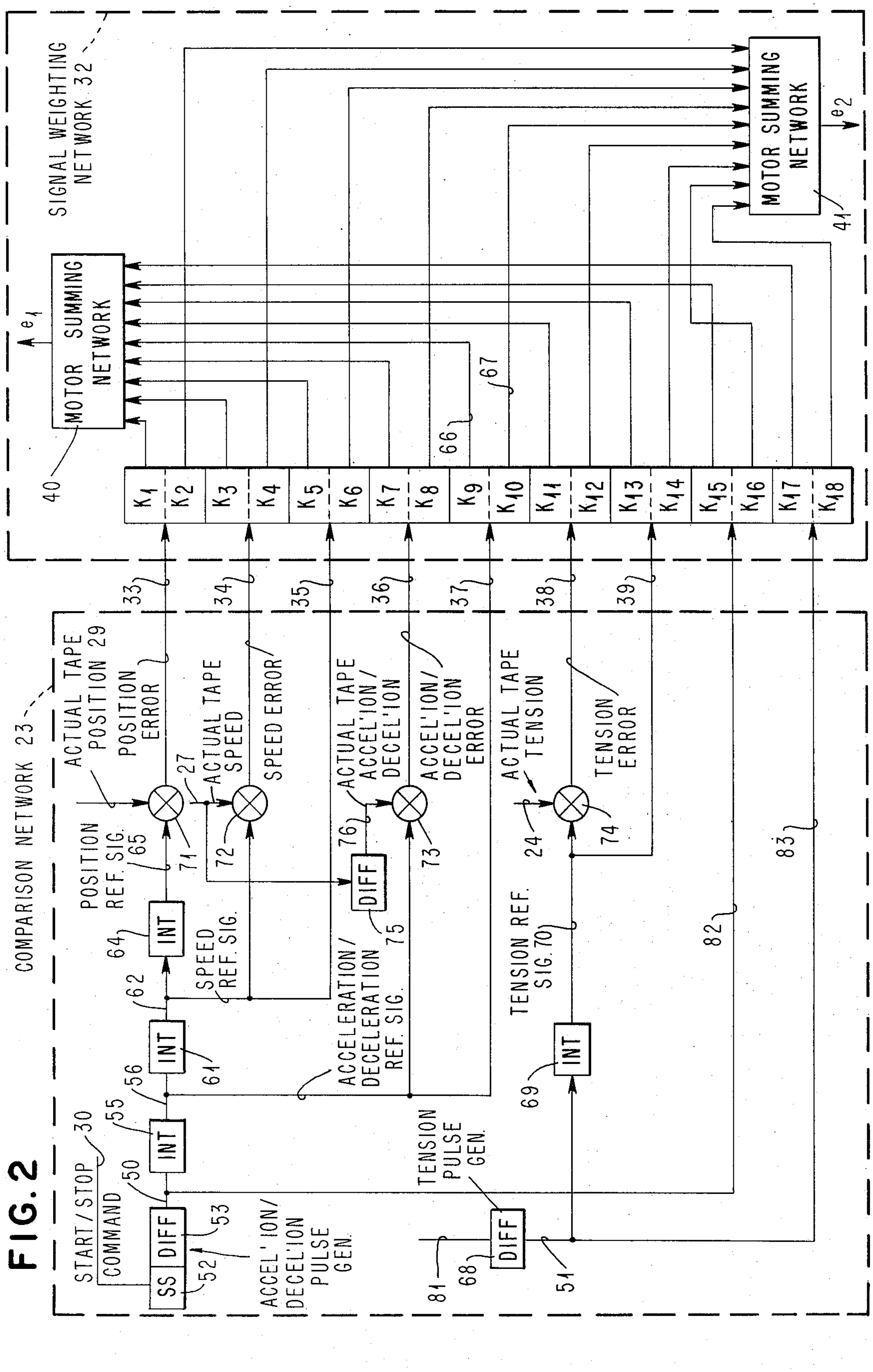
FIG. 2 is a schematic showing of the comparison network and the signal weighting network of FIG. 1, this figure showing the manner in which the characterized start/stop and characterized tension signals, and the acceleration, speed and tension reference signals and the acceleration, speed, position and tension error signals are each individually weighted for each of the two reel motors, FIG. 3 graphically depicts the successive integration of the characterized start/stop command pulse (acceleration/deceleration pulse generator output) to originate the acceleration, speed and position reference signals of FIG. 2, FIG. 4 graphically depicts the integration of the characterized start/stop command pulse (differentiator output) to originate the tension-reference signal of FIG. 2, and FIG. 5 discloses the formula whereby the weighting factors $K_1$–$K_{18}$ of FIG. 2 originate the two motor energizing voltages $e_1$ and $e_2$ from the two characterized command signals (start/stop and tension), the three reference signals (acceleration, speed and tension) and the four error signals (acceleration, speed, position and tension).

Comparison network 23 preferably takes the form shown in FIG. 2. In order to simplify the disclosure of FIG. 2, forward/backward command 31 of FIG. 1 is not shown. This command provides bidirectional movement of tape 12 and the structure accomplishing this function is known to those of ordinary skill in the art.

Network 23, FIG. 2, is constructed and arranged to electrically manipulate start/stop command 30, as by successive integration, in order to provide an acceleration/deceleration-reference signal, a speed-reference signal, a position-reference signal, and a tension-reference signal. Furthermore, network 23 utilizes comparison or summing techniques to compare these reference signals to like signals which define the actual tape parameters, and thereby provides like error signals.

The reference outputs (acceleration, speed and tension) and the error outputs (acceleration, speed, tension and position) of network 23 are applied as inputs to signal weighting network 32 by way of conductors 33–39, respectively.

The characterized start/stop command pulse and the characterized tension command pulse of network 23 are applied as inputs to signal weighting network 32 by way of conductors 82 and 83, respectively.

Network 32 may take many forms, as apparent to those of ordinary skill in the art. For example, network 32 may be a resistive network which reduces the magnitude of the individual signals on conductors 33–39 prior to applying these signals to motor summing networks 40 and 41. Network 32 is shown as having only one set of weighting components $K_1$–$K_{18}$. Bidirectional rotation of motors 11 and 14 is achieved by reversing the polarity of the start/stop command signal. If the characteristics of the reel-to-reel system are not the same for both directions of tape movement, it may be necessary to also provide a second set of weighting components, one set for each direction of rotation.

Network 32 jointly controls motors 11 and 14 by way of motor drivers 42 and 43, respectively. The servomechanism control order accomplished by network 32 is shown in the formulas of FIG. 5.

Turning now to a more detailed explanation of comparison network 23 and signal weighting network 32, FIG. 2, binary start/stop command 30 makes a transition from a first to a second state as a command to start moving tape. As a result of this command, the tape, which is stopped in a rest condition, is accelerated to a steady-state running speed and is maintained at this speed until start/stop command 30 subsequently makes a transition from the above-mentioned second state to the first state. This second-state-to-first-state transition is a stop command, resulting in decelerating the tape from the running speed to the rest condition.

The start command transition of conductor 30 is effective to generate a characterized start command pulse on conductor 50. Specifically, a monostable device in the form of a single shot 52 provides a square-wave output pulse which is differentiated by differentiator 53. The leading edge of this square-wave causes the characterized start command pulse 54 disclosed in waveform A of FIG. 3 to be provided at conductor 50 as single shot 52 makes a transition from its stable to its unstable state. Waveform A of FIG. 3 can be expressed mathematically as $(d/dt)\gamma = -(1/Ta)\gamma$; where $Ta$ is the time constant of the waveform and $\gamma$ is the characterized start command pulse, which starts from a desired initial condition $\gamma_o$. The initial condition $\gamma_o$ is selected based upon a desired maximum acceleration/deceleration condition, and is equal to the peak magnitude of the waveform. Characterized pulse 54 is integrated by integrator 55 to originate that portion of the acceleration/deceleration-reference signal 56 defined between the points 57 and 58 of curve B, FIG. 3. Waveform B of FIG. 3 can be expressed mathematically as $(d/dt)\alpha = (1/Ta)\gamma$; where $\alpha$ is the acceleration/deceleration reference signal. At 58 and thereafter the magnitude of the acceleration/deceleration-reference signal remains constant until the end of the timing period of single shot 52. When single shot 52 makes a transition from its unstable to its stable state, pulse 58 is generated and the acceleration/deceleration-reference signal returns to its zero level at time 60.

Acceleration/deceleration-reference signal B of FIG. 3 is integrated by integrator 61 (FIG. 2) to provide a speed-reference signal at conductor 62. This speed-reference signal is shown in waveform C of FIG. 3. Waveform C of FIG. 3 can be expressed mathematically as $(d/dt)\omega = \alpha$; where $\omega$ is the speed reference signal. As can be seen from this waveform, the magnitude of the apeed-reference signal achieves a steady-state value at point 63, this value being calculated to provide the desired steady-state running speed of the length of unbuffered tape.

Speed-reference signal on conductor 62 is integrated by integrator 64 to originate a position-reference signal on conductor 65. This position-reference signal is shown in curve D of FIG. 3. Waveform D of FIG. 3 can be expressed mathematically as $(d/dt)\phi = \omega$; where $\phi$ is the position reference signal.

The various waveforms A-D of FIG. 3 are shown in simple form. For example, substantially linear acceleration is shown, and a steady-state running speed is shown. However, it is recognized that these curves may have a more complex shape and such a system is considered to be within the scope of the present invention.

The acceleration/deceleration-reference signal, on conductor 56, is applied directly to conductor 37 and to weighting components $K_9$ and $K_{10}$ of signal summing network 32. Each of the weighting components $K_9$ and $K_{10}$ is uniquely calculated to provide a weighted output on conductors 66 and 67 to motor summing networks 40 and 41 associated with motor motor drives 42 and 43, and with motors 11 and 14, respectively.

In like manner, the speed-reference signal on conductor 62 is applied, by way of conductor 35, to the individual weighting components $K_5$ and $K_6$. These weighting components in turn provide weighted speed-reference signals to motor summing networks 40 and 41, respectively.

Tension command 81 is applied to a tension pulse generator in the form of differentiating network 68. The output of differentiating network 68 is a characterized tension command pulse. This pulse is integrated by integrator 69 to provide a tension-reference signal on conductor 70.

Curve A of FIG. 4 discloses the character of the signal on conductor 51, FIG. 2. Curve A of FIG. 4 can be expressed mathematically as $(d/dt)\beta = (1/T_f)\beta$; where $T_f$ is the time constant of the weveform and $\beta$ is the characterized tension command pulse, which starts from the desired initial condition $\beta_o$. This initial condition is selected based upon a desired tension, and is equal to the peak magnitude of the waveform. This signal is integrated to produce the tension-reference signal, curve B. Curve B of FIG. 4 can be expressed mathematically as $(d/dt)f = (1/T_f)\beta$; where $f$ is the tension reference signal. These two signals are shown in a form to increase tape tension from a level represented by point 80 to a steady-state higher level 81. It is recognized that the curve defining the tape tension parameter may have a more complex shape, as such an arrangement is considered to be within the scope of the present invention.

Conductor 39 connects the tension reference signal to the individual signal weighting components $K_{13}$ and $K_{14}$. In this manner, individually weighted tension-reference signals are applied to motor summing networks 40 and 41, respectively.

Comparison network 23 includes comparison or summing junction means 71, 72, 73 and 74. These summing junctions are associated with the position-reference signal, the speed-reference signal, the acceleration/deceleration-reference signal, and the tension-reference signal, respectively.

Considering summing junction 71, the position-reference signal on conductor 65 is compared to an opposite polarity actual-tape-position signal on conductor 29 to originate a position-error signal on conductor 33. In a like manner, summing junction 72 compares the speed-reference signal on conductor 62 to an opposite polarity actual-tape-speed signal on conductor 27 in order to originate a speed-error signal on conductor 34.

The actual-tape-speed signal on conductor 27 is differentiated by differentiator 75 to provide an actual-tape-acceleration/deceleration signal on conductor 76. As an alternative, motor armature current of the two motors provides a measure of actual-tape-acceleration/deceleration. This signal is compared to an opposite polarity acceleration/deceleration-reference signal on conductor 56 to originate an acceleration/deceleration-error signal on conductor 36.

Summing junction 74 compares the tension-reference signal on conductor 70 to the opposite polarity actual-tape-tension signal on conductor 34 in order to originate a tension-error signal on conductor 38.

The construction or magnitude of the individual signal weighting components $K_1$–$K_{18}$ of signal weighting network 32 is derived through the use of iterative procedures known to those skilled in the art, for example see the publication, OPTIMAL CONTROL; AN INTRODUCTION TO THE THEORY AND ITS APPLICATIONS, by M. Athens and P. L. Falb, McGraw-Hill Book Company, New York, 1966. In summary, this iterative optimization procedure involves the definition of the reel-to-reel system by means of a differential equation mathematical model. The optimization goal is to identify the factors $K_1$–$K_{18}$ whereby the mode of motor energization, defined by the formula $e_1$ and $e_2$ of FIG. 5, will dynamically produce weighted command signals (start/stop and tension) and weighted reference signals (speed, acceleration, position and tension) which energize the two motors in a manner to achieve desired reel-to-reel tape motion without the use of the error or feedback signal components, these latter components being required only to make correction for errors caused by static or dynamic deviation between the actual reel-to-reel system and its mathematic model. In other words, the more closely the model and the actual system are matched, the less effect the error terms of the formula of FIG. 5 are necessary to produce the desired system performance. One of the critical criteria of the present invention is that the reel-to-reel system, including the electrical and mechanical components thereof, must not at any time experience saturation. The reference signals, above described, are weighted so as to keep the reel-to-reel system out of saturation, and yet the electrical components of the system, and motor drivers 42 and 43 in particular, can be operated near the saturation limit.

Using the mathematical model structure described in Chapter 4 of the above-mentioned Athens and Falb publication, the differential equation model of the reel-to-reel system of FIG. 1, described previously, can be represented as a set of linear differential equations of the form $$\dot{x}(t) = Fx(t) + Gu(t)$$
$$y(t) = Hx(t)$$

where $x$ is the state vector, $u$ is the control vector, $y$ is the output vector, and F, G, and H contain the differential equation parameters for the particular system. State vector $x$ can be expressed as $$x = \begin{bmatrix} i_1 \\ i_2 \\ \omega_a \\ \phi_a \\ \gamma_r \\ \alpha_r \\ \omega_r \\ \phi_r \\ \beta_r \\ f_r \end{bmatrix}$$

where the subscript $r$ denotes reference signals, and the subscript $a$ denotes actual signals. The control vector and the output vector are expressed as $$u = \begin{bmatrix} e_1 \\ e_2 \end{bmatrix} \quad \text{and } y = \begin{bmatrix} \omega \\ \phi \\ f \end{bmatrix}$$

The quadratic performance criteria and a design procedure for obtaining an optimum system are described in Chapter 9 of the above-mentioned publication. This criteria and design procedure are applied to the reel-to-reel system to derive the motor energization voltages $e_1$ and $e_2$ required to drive the system in the desired manner. The end results of this optimization procedure are equations for the motor energization voltages in terms of the system variables (states) and the set of weights $K_1$ through $K_{13}$ to be used in these equations, which are illustrated in FIG. 5.

Referring specifically to FIG. 5, the equation $e_1$, that is the output of motor summing network 40 which energizes motor 11 by way of driver 42, includes a speed reference term S$r$, an acceleration reference term A$r$, a tension reference term T$r$, a start/stop command term $C_1$, and a tension command term $C_2$, associated with weighting components $K_5$, $K_9$, $K_{13}$, $K_{15}$ and $K_{17}$, respectively. These five terms of equation $e_1$ nominally provide actual system performance which is identical to the calculated performance of the mathematical model. The error terms associated with position error, speed error, acceleration error and tension error, and associated with the weighting components $K_1$, $K_3$, $K_7$ and $K_{11}$, respectively, normally provide only dynamic effects on the mode of energization of motor 11. Should the mathematical model differ significantly from the actual model, certain of these error components may continuously control energization of motor 11, thus causing the actual model to provide the desired tape movement parameters.

In a like manner, equation $e_2$ of FIG. 5 defines the mode of energization of motor 14.

The exact weighting to be provided by weighting components $K_1$–$K_{18}$ is not disclosed herein since this weighting depends upon the particular characteristics of the reel-to-reel transport, such as the characteristics of motors 11 and 14, the characteristics of supply reel 11 and take-up reel 13, and the characteristics of the tape support and guidance mechanism utilized to guide the length of unbuffered tape 12 extending between the two reels. Whatever the value of these weighting components, they will, in accordance with the present invention, follow the general constraints imposed by the above description and the formulas of FIG. 5.

While the invention has been particularly shown and described with reference to a preferred embodiment thereof, it will be understood by those skilled in the art that various changes in form and details may be made therein without departing from the spirit and scope of the invention.

What is claimed is:

1. A reel-to-reel web transport, comprising:

a supply reel and a motor for driving said supply reel, a take-up reel and a motor for driving said take-up reel, a length of unbuffered web extending between said reels, means providing an actual-web-speed signal indicative of the speed of said length of unbuffered web, means providing an actual-web-acceleration signal indicative of the acceleration of said length of unbuffered web, means operable upon a need to move said web to generate a start command pulse which is characterized such that integration thereof provides an acceleration-reference signal, first integrating means operable to integrate said start command pulse to produce said acceleration-reference signal, second integrating means operable to integrate said acceleration-reference signal to produce a speed-reference signal, first comparison means receiving as input said actual-tape-speed signal and said speed-reference signal and operable to originate a speed-error signal, second comparison means receiving as input said actual-web-acceleration signal and said acceleration-reference signal and operable to originate an acceleration-error signal, a first signal weighting network receiving as inputs said speed-reference signal, said acceleration-reference signal, said speed-error signal and said acceleration-error signal, said weighting network providing an individually weighted output signal for each of said two motors for each of said four input signals, the weighting of said signals being such that said two reference signals produce desired web speed and acceleration with minimal magnitude of said two error signals, and means connecting said individually weighted output signals in servo controlling relation to said two motors.

2. A reel-to-reel web transport as defined in claim 1, including:

means providing an actual-web-tension signal indicative of the tension in said length of unbuffered web, means operable upon a need to move said web to generate a tension which is characterized such that integration thereof provides a tension-reference signal, third integrating means operable to integrate said tension command to produce said tension-reference signal, third comparison means receiving as input said actual-web-tension signal and said tension-reference signal and operable to originate a tension-error signal, a second signal weighting network receiving as inputs said tension-reference signal and said tension-error signal, said second weighting network providing an individual weighted output signal for each of said two motors for each of said two input signals, the weighting of said signals being such that said tension-reference signal produces desired web tension with minimal magnitude of said tension-error signal, and means connecting said individually weighted output signals of said second weighting network in servo controlling relation to said two motors.

3. A reel-to-reel web transport as defined in claim 2, including:

means providing an actual-web-portion signal indicative of the actual position of a reference position on said web, fourth integrating means operable to integrate said speed-reference signal to produce a position-reference signal, fourth comparison means receiving as input said actual-web-position signal and said position-reference signal and operable to originate a position-error signal, a third signal weighting network receiving as input said position-error signal, said third weighting network providing an individually weighted output signal for each of said two motors, and means connecting said individually weighted output signal of said third weighting network in servo controlling relation to said two motors.

4. A reel-to-reel web transport as defined in claim 1, including:

means operable upon a need to stop said web to generate a stop command pulse which is characterized such that integration thereof provides a deceleration-reference signal, and wherein said first integrating means is operable to integrate said stop command pulse to produce said deceleration-reference signal, wherein said second integrating means is operable to integrate said deceleration-reference signal and thereby reduce said speed-reference signal to zero, and wherein said second comparison means receives as input said actual-web-acceleration signal and said deceleration-reference signal and is operable to originate a deceleration-error signal which is connected as input to said first weighting network.

5. A reel-to-reel web transport as defined in claim 4, including:

means responsive to said stop command to select a web reference position as a stop-command position, whereby said third signal weighting network is effective to servo control said two motors to a stop in relation to said stop-command position.

6. A reel-to-reel magnetic tape transport, comprising:

a supply reel and a motor for driving said supply reel, a take-up reel and a motor for driving said take-up reel, a length of unbuffered tape extending between said reels, a data processing station adjacent said length of unbuffered tape and defining an operable interface therewith, the operating characteristics of which are related to tape speed and tension at said interface, first means operable to provide an output signal indicative of actual-tape-speed at said interface, second means operable to provide an output signal indicative of actual-tape-acceleration/deceleration, control means responsive to a need to start or stop tape movement through said processing station and operable to generate a characterized start/stop command pulse whose integral is a measure of a desired tape acceleration/deceleration profile as tape accelerates from rest to a constant running speed as a result of a start command, and decelerates from said running speed to rest as a result of a stop command, first integrating means receiving as input said start command pulse and providing as output an acceleration/deceleration-reference signal, second integrating means receiving as input said acceleration/deceleration-reference signal and providing as output a speed-reference signal, first summing means receiving as input said actual-tape-speed signal and said speed-reference signal and providing as output a speed-error signal, second summing means receiving as input said actual-tape-acceleration/deceleration signal and said acceleration/deceleration-reference signal and providing as output an acceleration/deceleration-error signal, first signal weighting means receiving as input said acceleration/deceleration-reference signal, said speed-reference signal, said acceleration/deceleration-error signal, and said speed-error signal, said first weighting means providing a separately weighted output signal for each of said four input signals and for each of said two motors, the weighting of said signals being such as to achieve a desired acceleration/deceleration profile and running speed with minimal error signal, and means connecting each of the respective four outputs of said first weighting means to servo control each of the respective two motors.

7. A reel-to-reel tape transport as defined in claim 6, including:

third means operable to provide an output signal indicative of actual-tape-tension as said interface, control means responsive to a need to start or stop tape movement through said processing station and operable to generate a characterized tension command pulse whose integral is a measure of the desired tape tension during the operating conditions of tape acceleration to said constant running speed, the running speed interval, and tape deceleration to rest, third integrating means operable to integrate said tension command pulse to produce a tension-reference signal, third summing means receiving as input said actual-tape-tension signal and said tension-reference signal and providing as output a tension-error signal, second signal weighting means receiving as input said tension-reference signal and said tension-error signal, siad second weighting means providing a separately weighted output signal for each of said two input signals and for each of said two motors, the weighting of said signals being such as to achieve a desired tension profile with minimal tension-error signal, and means connecting each of the respective two outputs of said second weighting means to servo control each of the respective two motors.

8. A reel-to-reel tape transport as defined in claim 7, including:

fourth means operable to provide an output signal indicative of actual-tape-position, fourth integrating means operable to integrate said speed-reference signal to produce a position-reference signal, fourth summing means receiving as input said actual-tape-position signal and said position-reference signal and providing as output a position-error signal, third signal weighting means receiving as input said position-error signal, said third weighting means providing a separately weighted output signal for each of said two motors, and means connecting each of said respective outputs of said third weighting means to servo control each of the respective two motors.

9. A reel-to-reel tape transport as defined in claim 8, including:

means responsive to a stop command to define a reference stop position for said tape relative to said interface, whereby said third signal weighting means is effective to servo control said two motors to stop said tape relative to said reference stop position.

* * * * *

PO-1050
(5/69)

UNITED STATES PATENT OFFICE
CERTIFICATE OF CORRECTION

Patent No. 3,809,335 Dated May 7, 1974

Inventor(s) JOHN P. MANTEY

It is certified that error appears in the above-identified patent and that said Letters Patent are hereby corrected as shown below:

Column 3, line 25, "as" (first occurrence) should read --an--.

Column 5, line 57, "sighal" should read --signal--.

Column 7, line 61, "58" should read --59--.

Column 8, line 4, "apeed" should read --speed--;

line 27, "motor drives" should read --drivers--;

line 43, after "=" insert -----;

line 44, "weveform" should read --waveform--.

Column 9, line 23, "34" should read --24--.

Signed and sealed this 24th day of September 1974.

(SEAL)
Attest:

McCOY M. GIBSON JR.
Attesting Officer

C. MARSHALL DANN
Commissioner of Patents